United States Patent [19]
Sorenson

[11] 3,823,595
[45] July 16, 1974

[54] WORKPIECE POSITIONER AND EJECTOR

[75] Inventor: Jess Frank Sorenson, Yucaipa, Calif.

[73] Assignee: Sorenson Engineering Inc., Yucaipa, Calif.

[22] Filed: July 31, 1972

[21] Appl. No.: 276,521

Related U.S. Application Data

[62] Division of Ser. No. 93,579, Nov. 30, 1970, Pat. No. 3,684,392.

[52] U.S. Cl. ................................ 72/312, 72/427
[51] Int. Cl. .................................. B21d 43/00
[58] Field of Search ......... 408/103, 108, 95, 62, 67; 269/14, 24, 32, 224, 321 H, 254 R; 29/561; 10/129 WH, 139 WH; 72/311, 312, 421, 427; 83/128, 153

[56] References Cited
UNITED STATES PATENTS

| 1,475,711 | 11/1923 | Morgan | 408/62 |
|---|---|---|---|
| 2,403,484 | 7/1946 | Ashworth | 408/62 |
| 2,417,091 | 3/1947 | Smith | 408/67 |
| 2,438,999 | 4/1948 | Hartley | 72/312 |
| 2,909,949 | 10/1959 | Winslow | 408/95 |
| 2,997,900 | 8/1961 | Pugsley | 408/95 |
| 3,221,532 | 12/1965 | Bazata | 72/312 |
| 3,371,514 | 3/1968 | Venables | 72/421 |
| 3,684,392 | 8/1972 | Sorenson | 408/103 |

Primary Examiner—Charles W. Lanham
Assistant Examiner—M. J. Keenan

[57] ABSTRACT

A workpiece positioner and ejector for use in secondary operation machines and the like in which the workpiece is carried by a support block on positioners which are freely slidable in the support block to a backing block which is mounted for resistive movement along with the support block is disclosed. As the support block approaches the backing block, the positioner is retracted into the support block such that the workpiece is then clamped between the support block and the backing block and, so clamped, is moved into contact with a tool at which position the tool performs a modifying operation on the workpiece. One or more resilient fingers exerts a force on the workpiece such that when the support block is moved away from the tool and the backing block, the workpiece is ejected. The support block is moved in one continuous motion toward the tool and in another continuous motion from the tool to its initial position.

2 Claims, 5 Drawing Figures

WORKPIECE POSITIONER AND EJECTOR

This is a division, of application Ser. No. 93,579, filed Nov. 30, 1970, now U.S. Pat. No. 3,684,392.

This invention relates to secondary operation machines of the type which perform modifying operations on workpieces produced by screw machines, and other machines of similar nature, in which a workpiece and/or a tool are moved relative to each other and wherein the tool performs modifying operations on the workpiece. More specifically, this invention relates to a process and apparatus for handling a workpiece before, during and after contact of the workpiece with the tool during which contact the tool modifies the workpiece.

Secondary operation machines and the like are well known in the prior art. Such machines conventionally position a workpiece and move, sequentially or simultaneously, one or more tools relative to the workpiece for performing modifying operations on the workpiece. For example, drills, grinding surfaces, saws, crimping devices, flaring devices, and many other types of tools may be used to perform any desired forming or modifying operation on the workpiece. The position of the workpiece is somewhat dependent upon the type and number of modifying operations which are to be performed, but the overall design and operation of such machines is not significantly affected by the nature of the tool or tools to be used.

The general practice in the prior art has been to position a workpiece and bring the tools to the workpiece. One principal reason for this general practice is the necessity for providing means for feeding workpieces to the position in relatively rapid succession and ejecting the workpieces following modification. Movement of the workpieces has usually involved the interaction of several movements and the performance of several steps in the movements in order properly to position and handle the workpiece. This necessarily resulted in comparatively complex mechanisms and often in uncertain and unpredictable operation. One of the features of this invention resides in the unique but simple mechanisms and steps which perform handling operations which have heretofore required complex operations, steps and mechanisms.

Because prior art workpiece handling mechanisms and processes were complex and involved many steps and often the interaction of many steps and mechanisms, there has been a practical and significant limitation upon the operational speed of secondary operation and like machines. These limitations result in many cases simply from the number of separate movements of mechanisms or steps required to position the workpiece, bring the tool to the workpiece, eject the workpiece, etc. Certain limitations also result from the inertia of the mechanisms and/or tools involved. It is, for example, impractical to move heavy mechanisms or tools in reciprocal or curved paths because of the extremely high strength and high bulk supporting and moving means required to insure reproducibility in motion and position and adequate tool and mechanism life. One of the significant features of this invention resides in the process and mechanisms for performing modifying operations and handling workpieces with minimum movement of high inertia parts with a minimum number of movement steps and movement mechanisms.

Another significant feature of the invention resides in the mechanism and process for rapidly ejecting modified workpieces from the handling mechanisms thereby affording greater speed and certainty of operation.

The machine of which this invention constitutes an improvement includes a bed, one or more tools, workpiece supplying means, reciprocal moving means and means for supporting, positioning and carrying workpieces from the supplying means outlet into contact with one or more tools for modifying the workpieces.

The supporting, positioning and carrying means for the workpieces includes a support block which is mounted directly or indirectly on the bed for reciprocal movement along a predetermined path from an initial position toward the tool and in the opposite direction back to the initial position. A backing block is mounted on the bed for resistive movement along a portion of the path of movement of the support block.

The support block includes positioning means freely slidably mounted on the support block for receiving, supporting and positioning the workpiece on the support block. The positioning means has a first position in which a positioning portion extends forwardly of the support block in the direction of the tool. It is upon this positioning portion that the workpieces are received, in rapid sequence. The positioning means also has a second position in which the positioning portion is retracted to the support block at which second position the workpiece is released for removal from the support block.

Stops are provided adjacent the path of movement of the support block for engaging the positioning means for limiting the movement of the positioning means, carried on the support block, toward the tool and, respectively, limiting the movement of the positioning means in the opposite direction, away from the tool. The support block is caused to move along the path in continuous motion toward the tool. The workpiece is positioned on the positioning portion of the positioning means so as to engage the backing block. As the workpiece engages the backing block, which moves with resistance along the same path as the support block, the workpiece is clamped by the support block in the backing block. The support block continues to move in one continuous motion carrying the clamped workpiece to one or more tools, such as drills, saws, etc. which perform the modifying operations on the workpiece. In another continuous motion, the support block is moved in the opposite direction toward the initial position.

As the support block is moved from the initial position toward the tool, the positioning means is engaged by the first stop. This has the effect of limiting further movement of the positioning means toward the tool thereby retracting the positioning portion into the block. The positioning portion, therefore, no longer provides underlying vertical support for the work means. By the time underlying vertical support for the work means is removed, however, the work means is clamped by the support block and the backing block. It is this clamping action that holds the workpiece in proper position while in contact with the tool or tools. As the support block is moved in the opposite direction, again in one continuous motion, the workpiece is first moved away from the tool and then the supporting block is moved away from the backing block. Since no underlying vertical support is provided by the positioning means, the workpiece falls from its clamped position. One or more resilient members, such as spring wires, may be provided for causing rapid ejection of the workpieces from the support and backing blocks.

The handling process comprises a small number of relatively simple steps, i.e., positioning the workpiece on reciprocably movable support means, moving the support means in one continuous motion toward reciprocably movable backing means with the workpiece being so positioned as to be clamped between the support and backing means by the movement, and, by the continuous motion, moving the clamped workpiece to the tool for being modified. Following modification, the next step is to move the supporting means in the opposite direction in one continuous motion away from the tool and then, in that continuous motion, to move the support means away from the backing means for thereby unclamping and releasing the workpiece.

Additional steps of removing the underlying vertical support for the workpiece as the support means approaches the backing means and applying an ejecting force to the workpiece may also be included.

The foregoing features, mechanisms and processes will appear more fully from the specification which describes an exemplary embodiment of the invention and from the exemplary drawings to which reference is made, it being understood that the specification and drawings are intended to describe and to illustrate a particular embodiment of the invention which will exemplify the operation and construction of the invention and that neither the specification nor the drawing are intended to be limiting with respect to particular configurations or relationships of mechanisms or steps, except as such configurations and relationships are defined in the claims.

This invention constitutes a machine, mechanism and process for modifying workpieces such as that shown at 10. The illustrative workpiece is illustrated as being in the form simply of a short rod or tube. This configuration generally is fairly conventional for the type of workpieces which may be handled by the mechanism of this invention; however, the invention is not limited to this type of workpiece and, indeed, any workpiece upon which modifying operations can be performed and which is susceptible to rapid handling can be modified according to the process and apparatus of this invention. Typically, but without limitation, the inventive apparatus and process is supplied with great efficiency to the performance of modifying operations on screw machine products.

Figure 3:
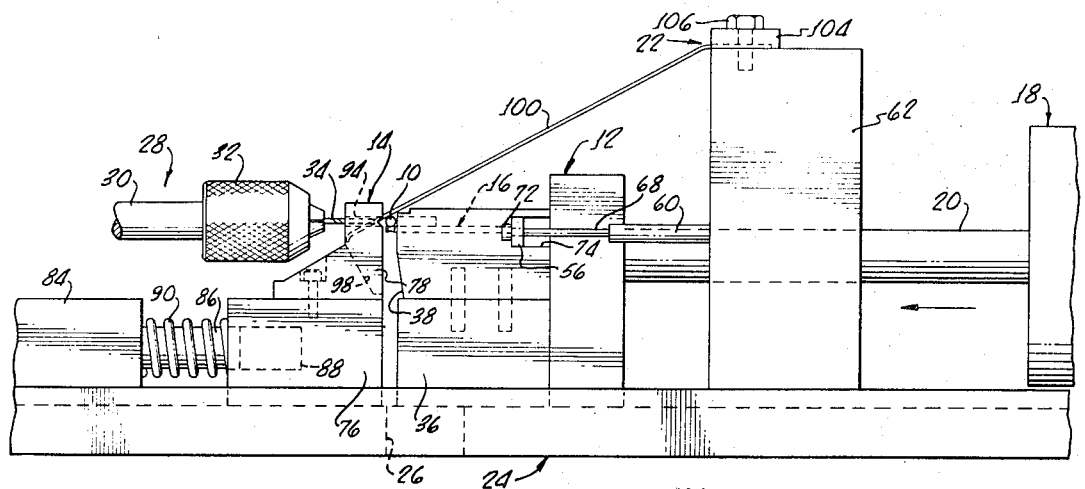
FIGS. 3, 4 and 5 show side elevational views of the machine and mechanism illustrated in FIG. 2 in various operating positions.
Figure 4:
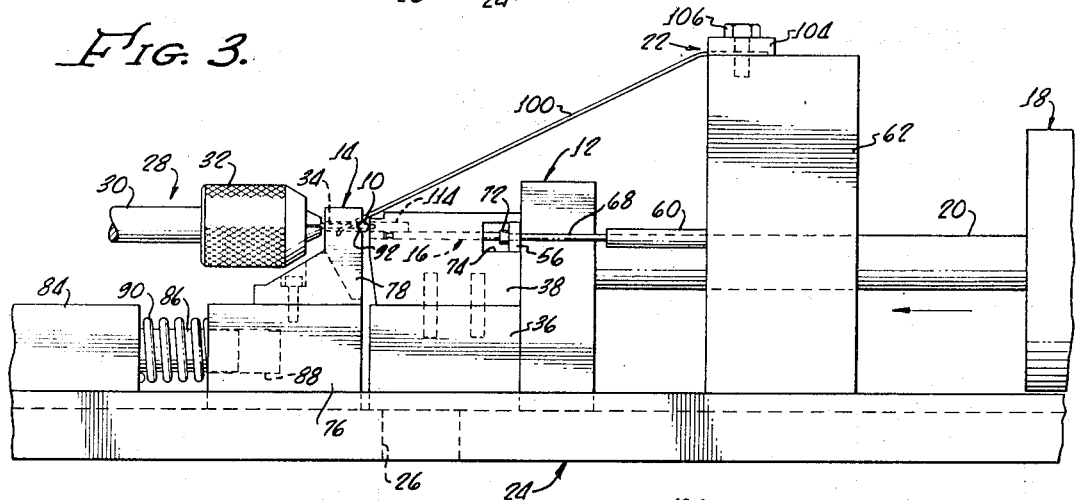
Figure 5:
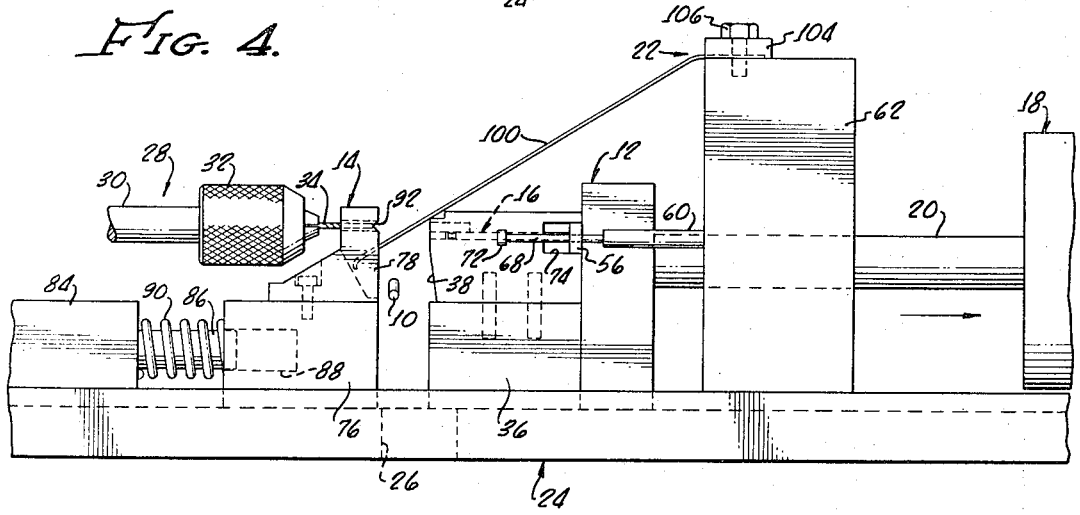

The mechanism includes reciprocably movable support means shown generally at 12 and reciprocably movable backing means shown generally at 14 positioned in the movement path of the support means. In addition, means such as the pin assembly shown generally at 16 are provided for positioning the workpiece so as to be clamped between the support and backing means as the support means approaches the backing means in reciprocal movement. Means, such as the moving means 18 and pusher rod 20 are provided for moving the support means from an initial position, shown in FIG. 2, toward the backing means, this movement being shown in FIG. 3. This results in the clamping of the workpiece between the support means and backing means, and the support means is further moved, so as to move the clamped workpiece into contact with the tool, as shown in FIG. 4. The moving means also moves the support means away from the tool and then away from the backing means toward the initial position thereby unclamping the modified workpiece, as shown in FIG. 5. The moving means, in the preferred embodiment, causes the support means to move in one continuous motion toward the tool and then in another continuous motion away from the tool.

The inventive mechanism also includes means, shown generally at 22, for exerting a force on the workpiece for ejecting the workpiece from the support means upon movement of the support means away from the tool. In the preferred embodiment, the ejecting means is engagable with the workpiece upon motion of the support means toward the tool for continuously thereafter exerting an ejecting force on the workpiece but is out of engagement with the workpiece when the support means is in the initial position.

The positioning means 16 in the preferred embodiment includes means mounted on the support means for movement from a first position wherein support portions of the positioning means extend from the support means to underlie and thereby support in the vertical plane and position the workpiece and for movement to a second position wherein the positioning portions are retracted into the support means for releasing the workpiece. Means are provided for moving the positioning portion from the first position to the second position and back to the first position upon reciprocal movement of the support means. At least one freely slidable member received in the support means is preferred as the central operative element of the positioning means. A member is considered to be freely slidable if it can be moved from one position to another on the support means by engagement with an external stop.

The aforementioned mechanisms are generally supported on a bed of some type, such an exemplary bed being illustrated at 24. The support by the bed may be direct or quite indirect within the meaning of this description. The exemplary bed includes an opening 26 through which the modified workpieces are permitted to fall or are ejected into a receptacle of any desired size and type. The moving means 18 and the tool, exemplified by the drill assembly shown generally at 28, may also be mounted on the bed, although no particular type of mounting is significant in the present invention.

While a drill assembly is illustrated as the modifying tool in the drawing and throughout the specification, it is to be clearly understood that this is merely an example of the type of tool which can be used and is no way limiting with respect to this invention since any type of workpiece modifying tool can be used. Such tools would include not only drill assemblies such as that illustrated in the drawing but saws, grinders, files, reamers, flaring tools, crimping tools, etc. It will also be understood that two or more tools may be used simultaneously for modifying the workpiece. Accordingly, while, for convenience reference is made hereinafter to moving the workpiece to a tool it will be understood that this and like expressions will encompass moving the workpiece a plurality of tools either simultaneously or sequentially.

It is also to be noted that the moving means 18 is designated merely as a portion of a box with the understanding that any type of conventional or unconventional moving means may be used. In the particular embodiment illustrated, the movement is linear and reciprocal and, in general, reciprocal movement is desired but the movement may be nonlinear. Indeed, movement may be along any predetermined path whether it be arcuate, sinusoidal, or otherwise. It is, of course, most simple generally to construct the inventive machine for reciprocal linear movement as is illustrated in the drawing of the exemplary embodiment.

The moving means may, for example, be a cam operated device which is convenient in that it permits variable speed continuous motion with relatively simple mechanisms in the apparatus. Of course, there are almost an infinite number of types of cams and cam mechanisms which are known, any of which may be used according to any particular output desired. Other types of moving means include rack and pinion devices, and any other type of mechanism which will provide the desired speed, type and extent of motion. Since all these types of moving means are well known, and because the particular type of moving means is of no consequence to the present invention, no detailed description or drawing showing the moving means is included. The reader is referred to Herkimer, Engineer's Illustrated Thesaurus, Wm. Penn Publishing Corp, New York, New York, 1952, and to standard mechanical engineering handbooks and publications for discussions and illustrations of the very numerous types of moving means which may be used in connection with this invention.

In the particular embodiment illustrated, the tool 28 includes a driven shaft 30, a check 32 and a drill bit 34, all of which are standard tool elements. In general, standard tool elements are used in connection with the present invention; however, custom made tool elements may likewise be used according to the general knowledge and skill of the art.

Figure 2:
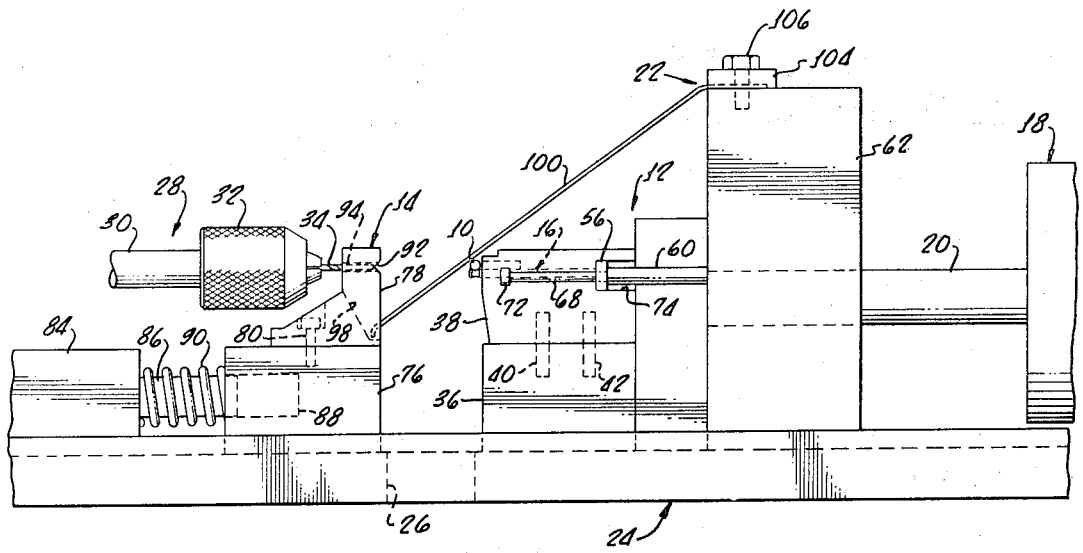
FIG. 2 is an elevational view of the invention with a portion of the moving means and the workpiece supplying means being omitted more clearly to illustrate the operation of the inventive mechanism and process as a part of the overall machine which forms this invention.
Figure 1:
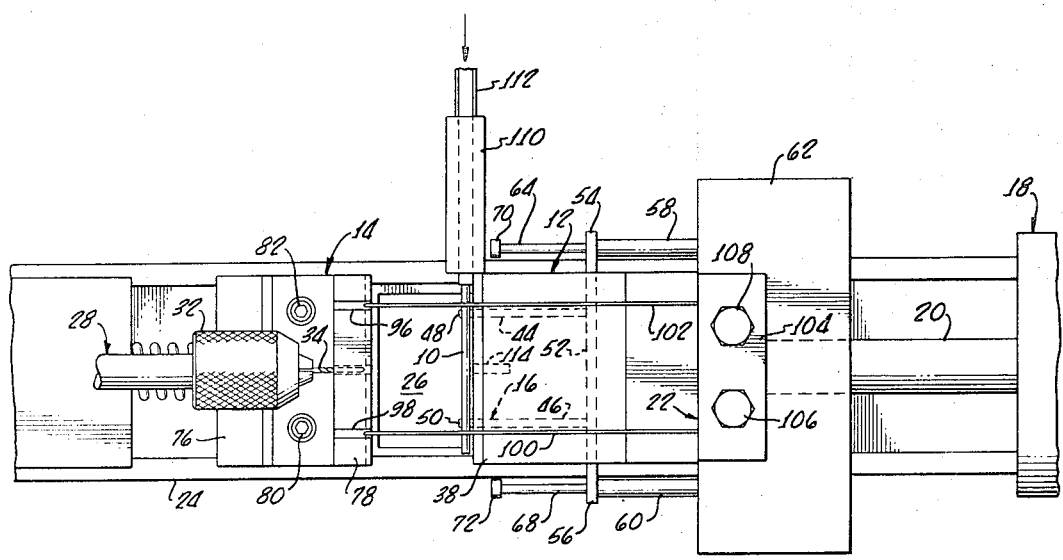
FIG. 1 is a plan view of the mechanism of this invention shown in association with the moving means, workpiece supplying means, and a tool, all of which exemplify means and mechanisms with which the inventive mechanism is conventionally used.

In the illustrated embodiment, the support means 12 includes a carriage 36 slidably mounted on the bed on guides or in grooves provided in the bed or otherwise according to known tool manufacturing techniques. The guide or groove defines the path of movement of the carriage. A support block 38 is mounted on the carriage by means of pins 40 and 42, or by any conventional or desired means such as screws, pins frictional fasteners of all types, etc. Freely slidable positioning means 16 includes, in the exemplary embodiment illustrated, a pair of elongate pins 44 and 46 having an end which, as illustrated in FIGS. 1 and 2, extends forwardly of the support block in the direction of the tool, the respective ends being shown at 48 and 50 supporting workpiece 10. These ends comprise the positioning portion of the pins which comprise the slidable positioning means. The pins are connected together at the opposite end by a cross bar 52 the ends of which extend outwardly from both sides of the support block and define apertures, as shown at 54 and 56.

In the illustrative embodiment of the invention a pair of rigid pins 58 and 60 extend from mounting block 62 outwardly toward the tool. Reduced portions 64 and 68, respectively, of pins 58 and 60 are slidably received in the apertures in the ends 54 and 56 of cross member 52. Enlarged portions 70 and 72 are provided on the distal ends of pins 58 and 60, respectively.

In the illustrated embodiment of the invention the shoulders formed at the opposite ends of the dimished portions 64 and 68 of pins 58 and 60 constitute stops. A stop is provided adjacent the path of movement of the support block for engaging the positioning means for limiting movement of the positioning means toward the tool. This stop, in the embodiment of the invention illustrated in the drawing, actually comprises two shoulders. In this respect, reference is made herein and in the claims to a stop with the understanding that two or more stops may be provided for performing the same function within the meaning of the phrase. Another stop, formed by shoulders at the other end of the reduced portions 64 and 68 are also positioned adjacent the path of movement of the support block for engaging the positioning means. In the latter case, the stops limit the movement of the positioning means away from the tool.

As best illustrated in FIGS. 2-5, the cross member 52 is received in a groove formed transversely across the rear end of the support block. This groove is illustrated as being more than twice as deep as the thickness of the cross member. This permits the cross member to move longitudinally with respect to the support block 38. As the support means, including the support block, is moved forwardly by means of pusher rod 20 and moving means 18, the ends 54 and 56 of cross member 52 at first slide freely along the reduced portions 64 and 68 of pins 58 and 60. As movement continues, the ends 54 and 56 of the cross member engage the stop formed by the shoulders at the distal end of the reduced portions 64 and 68 of the pins. This limits further movement of the positioning means toward the tool and causes the positioning portion to be retracted into the support block. Similarly, movement in the opposite direction results at first in freely sliding movement of the ends 54 and 56 of the cross member 52 along the reduced portions 64 and 68 of the fixed pins 58 and 60. When the ends 54 and 56 engage the stop formed by the shoulders at the ends of the reduced portions 64 and 68 which are proximate the guide block 62, further movement of the positioning means is limited and the positioning portions thereof are again extended forwardly with respect to the support block which continues to move in the rearward direction.

The backing means 14 includes a backing carriage 76 and a backing block 78 mounted thereon by means of a pair of bolts 80 and 82, or by any other desired fastening means. The backing carriage 76 is mounted for resistive movement along a portion of the path of movement of the support block. Resistive movement in the illustrated embodiment is provided by a fixed stop 84, a guide pin 86 slidably received in an opening 88 in support carriage 76 and by a compression spring 90. The backing carriage 76 moves along a portion of the same path along which the support means moves but movement along this path is resisted by resilient compression of spring 90. Resistive movement of the backing means may be provided by any of a large number of mechanisms. Resistive movement can be provided satisfactorily by providing, for example, for high inertia components, a comparatively high coefficient of friction between the backing means and the bed, guide, groove or track along which the backing means moves, by dash pot action, by interlinkage with the moving means, etc. It is convenient to provide means such as the spring for permitting resistive movement along the path and, in addition, returning the backing means to its original position without the application of external force. There are many mechanisms, only some of which have been suggested, which are fully equivalent to the illustrated means for providing resistive movement of the backing means.

The backing block 78 is, in the illustrated embodiment, formed with a V-shaped groove 92 and includes an aperture 94 extending therethrough for receiving the drill bit 34. The block is also grooved as shown at 96 and 98 for receiving resilient wire springs 100 and 102 which comprise means exerting a force on the workpiece for ejecting the workpiece from the support means upon movement of the support means away from the tool. The wire springs 100 and 102 are mounted on the guide block 62 by means of a plate 104 and bolts 106 and 108. Of course, many variations and equivalents of the force exerting means are possible within the skill of the art. Leaf springs, weighted pivoted members, pneumatic or hydraulic actuated elements, etc., may be used for exerting the desired force on the workpiece; however, the use of a pair of resilient wire springs has been found most satisfactory.

A positioning guide 110 connected to a tubular conduit 112 comprises means for supplying workpieces to the support block. The workpiece supplying means also includes conventional sorters, positioners, and feeding mechanisms, all of which are well known in the art. The workpiece supplying means may be of any design, automatic or manual.

The operation of the inventive mechanism is best understood from the following discussion and a comparison of FIGS. 2, 3, 4 and 5.

FIG. 1 illustrates the support means including the support block in its initial position. A workpiece 10 is carried on the positioning portion of the positioning means 16. As the pusher rod 20, which is connected to the carriage 36, moves to the left in the drawing, as illustrated in FIG. 3, the workpiece 10 is engaged by the wire springs 100 and 102. These resilient members exert a force on the workpiece during the forward motion and part of the rearward motion of the support means but are not in engagement with the workpiece when the support means is in its initial position. The cross member 52 is engaged by the stop formed by the enlarged portions 70 and 72 on pins 58 and 60 when a support means reaches the position shown in FIG. 3. Thereafter, the positioning means 16 remain stationary while the support means continues to move toward the tool.

As shown in FIG. 4, the positioning means is retracted into the support block and the workpiece 10 is clamped between the support block and the backing block, positioning and supporting in the vertical support plane being accomplished by means of the clamping coaction between the two blocks and the V groove 92 in the backing block. The resistive movement provided by the compression spring 90 results in the sufficient clamping action to provide support for the workpiece during the remainder of the movement. As likewise illustrated in FIG. 4, the backing block has moved to the left as the support block has moved toward the tool, thereby driving the workpiece into contact with the tool which performs the desired modifying operation. In the illustrated embodiment, a hole is drilled laterally of the workpiece. In practice, the tool may perform many of a great variety of modifying operations on the workpiece.

The precise configuration of the backing block and of the support block depends to some extent on the type of tool and type of modifying function involved. In the illustrated embodiment, for example, an aperture 114 is desirably provided in the forward end of the support block for receiving the drill bit 34. If a saw is used, it is usually desirable to provide a groove in the backing block and/or the support block to permit the proper contact of the workpiece with the saw. All of these considerations are, of course, within the skill of the art in view of the present disclosure.

It is to be noted in FIGS. 4 and 5 that the positioning means 16 is fully or substantially retracted into the support block and that no underlying support in the vertical plane is provided by the support block for the workpiece. It is also to be noted that the resilient means 22 exert a force on the workpiece. While the workpiece is clamped as in FIG. 4, this force is resistive; however, as the moving means begins moving the carriage and support block to the right, as in FIG. 5, the workpiece and backing block are first moved away from the tool and then the support block is moved away from the backing block. Since the support block provides no vertical support for the workpiece, the workpiece is free to fall from the previously supported position. Indeed, the mechanism and process of this invention are quite operable in the absence of force exerting means such as is illustrated at 22; however, for high speed operation it is desirable to provide means for exerting a force so as to cause the workpiece to be quickly and completely ejected from the work area. The provision of resilient ejecting force permits the process of modifying the workpieces to be carried out at a much more rapid rate than would otherwise be possible.

As a support block continues to move to the right as illustrated in FIG. 5, the cross member 52 of the positioning means engages the shoulders proximate the guide block 62. This limits further movement of the positioning means toward the guide block and away from the tool and causes relative movement of the positioning means to the support means. As the support means continues to move to the right to its initial position, the positioning portion of the positioning means again extends forwardly of the support block. When the support is in the initial position, the positioning portions extend forwardly of the support block a sufficient distance to provide adequate support for the workpiece and, in this position, the force exerting means is so positioned and constructed as to be out of engagement with the workpiece, thereby permitting the workpiece to be inserted into position on the support means either by the workpiece supplying means illustrated, by hand, or by any other means for supplying and positioning workpieces.

One important feature of the invention is its great simplicity in that only one moving means is required and this moving means consists simply of means for providing reciprocal motion. The rod 20 constitutes means for transmitting movement from the moving means to the support block for moving the support block along the movement path, desirably in one continuous motion toward the tool. The continuous motion may be variable in speed, however, and stepped motion can be used but makes operation more complex. The workpiece is positioned on the positioning portion of the support block so as to engage the backing block and, by reason of the resistive movement of the backing block, to be clamped between the backing block and the support block. The support block continues to move toward the tool thereby moving the workpiece so clamped between the backing and support blocks toward and into modifying contact with the tool. The rod 22 also moves the support block back along the movement path in the opposite direction in one continuous motion to the initial position. In this movement in the opposite direction, the support block is first moved away from the tool and then away from the backing block, whereupon the workpiece is released from the clamping action of the backing and support blocks. When the support block is in the initial position, it receives another workpiece.

This high degree of simplicity permits more rapid operation than is possible with any known prior art mechanism because only low inertias are involved and because it is unnecessary to coordinate and provide precise timing for a large number of operational steps, such as are required in the operation of prior art processes and machines.

Another important and simplifying feature of this invention is that the means for moving the positioning means from the first position, wherein the positioning portion is extended from the block, to the second position and back to the first position constitutes simply stops placed in spaced relation along the path of movement of the support block. The need for precise timing and complex interaction mechanisms is avoided by the elegant simplicity of the concept of the process and mechanism of this invention.

There are, within the concept and scope of this invention, many modifications which can be made within the skill of the art and many structures and mechanism designs which are the equivalent of the mechanisms illustrated in the drawing for exemplifying the invention. It has already been mentioned that there are many types of tools which may be used in the invention, many kinds of force exerting means, many kinds of mechanisms and movements to provide resistive movement of the backing block, etc. In addition, other types of stops, guides, carriage members and the like may be provided. Stops may, for example, be fastened to the bed directly or indirectly rather than to the guide block. Likewise, the force exerting means may be fastened directly to the bed or indirectly to the bed and the guide block may be omitted, if desired. The positioning means may, as in the example illustrated in the drawing, take the form of a pair of freely slidable pins. Likewise, the positioning means may be a single element, a multiplicity of elements, and may be so configured and disposed as to coact with stop means of any desired configuration. These are, of course, but a few of the various modifications which may be made to the invention within the skill of the art in view of the teachings of the specification and drawing without departing from the spirit and scope of the invention as defined in the following claims.

We claim:
1. The process of performing modifying operations on a workpiece comprising the steps of:
  supplying the workpiece to positioning means carried by movable support means, the workpiece being positioned on the movable support means so that the workpiece is clamped between the support and backing means as the support means approaches backing means;
  moving the support means in one continuous motion toward reciprocably movable backing means,
  removing the positioning means from supporting relationship with the workpiece as the support means approaches the backing means so that after such removal the workpiece is supported by being clamped between the support means and the backing means;
  moving the clamped workpiece and said support and backing means toward a tool whereby the tool contacts and modifies the workpiece; and
  moving the support means in the opposite direction in one continuous motion away from the tool and then, in said continuous motion, away from the backing means for thereby unclamping and releasing the workpiece.

2. The process as defined in claim 1 further comprising the step of:
  exerting a force on the workpiece for thereby ejecting the workpiece from the support means upon movement of the support means away from the tool.

* * * * *